United States Patent
Duvaut et al.

(10) Patent No.: US 7,653,138 B2
(45) Date of Patent: Jan. 26, 2010

(54) TECHNIQUE FOR IMPROVING MULTIPLE-CHANNEL MULTI-TONE TRANSMISSIONS

(75) Inventors: Patrick Duvaut, Tinton Falls, NJ (US); Ehud Langberg, Wayside, NJ (US); William Scholtz, Red Bank, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 936 days.

(21) Appl. No.: 10/874,329

(22) Filed: Jun. 24, 2004

(65) Prior Publication Data

US 2005/0013379 A1   Jan. 20, 2005

Related U.S. Application Data

(60) Provisional application No. 60/480,769, filed on Jun. 24, 2003.

(51) Int. Cl.
  *H04L 27/00* (2006.01)
(52) U.S. Cl. .................. 375/259; 375/260; 375/267
(58) Field of Classification Search .......... 375/259, 375/260, 222, 267, 347; 370/352, 465, 535, 370/537, 389, 208
  See application file for complete search history.

(56) References Cited

U.S. PATENT DOCUMENTS

| | | | |
|---|---|---|---|
| 6,456,653 B1 | 9/2002 | Sayeed | |
| 7,095,790 B2 * | 8/2006 | Krishnan et al. | 375/260 |
| 7,106,760 B1 * | 9/2006 | Perumal et al. | 370/535 |
| 2002/0051435 A1 | 5/2002 | Giallorenzi et al. | |
| 2002/0181609 A1 | 12/2002 | Tzannes | |
| 2003/0007509 A1 | 1/2003 | Tzannes et al. | |
| 2003/0035491 A1 | 2/2003 | Walton et al. | |
| 2003/0048802 A1 | 3/2003 | Shenoi | |
| 2003/0064690 A1 | 4/2003 | Kasapi | |
| 2003/0073464 A1 | 4/2003 | Giannakis et al. | |

(Continued)

FOREIGN PATENT DOCUMENTS

EP    1185001 A2    3/2003

(Continued)

OTHER PUBLICATIONS

Gesbert, D.; Shafi, M.; Da-shan Shiu; Smith, P.J.; Naguib, A.;"From theory to practice: an overview of MIMO space-time coded wireless systems," IEEE Journal on Selected Areas in Communications, vol. 21, Issue: 3, Apr. 2003, pp. 281-302.

(Continued)

*Primary Examiner*—David C Payne
*Assistant Examiner*—Rahel Guarino
(74) *Attorney, Agent, or Firm*—Thomas, Kayden, Horstemeyer & Risley, LLP

(57) ABSTRACT

A technique for improving multiple-channel multi-tone transmissions is disclosed. According to one particular embodiment, a method for transmitting data over at least two bonded channels is provided, wherein each of the at least two bonded channels comprises a plurality of tones. The method may comprise: transmitting a first symbol stream over a first tone in a first bonded channel and over a second tone in a second bonded channel, wherein the first tone is bonded to the second tone, and the transmissions over the first tone and the second tone are substantially in parallel; transmitting a second symbol stream over a third tone in the first bonded channel; and transmitting a third symbol stream over a fourth tone in the second bonded channel, wherein the third tone is bonded to the fourth tone, and the transmissions of the second symbol stream and the third symbol stream are substantially in parallel.

19 Claims, 5 Drawing Sheets

U.S. PATENT DOCUMENTS

| | | |
|---|---|---|
| 2003/0076890 A1 | 4/2003 | Hochwald et al. |
| 2003/0086371 A1 | 5/2003 | Walton et al. |
| 2003/0087651 A1 | 5/2003 | Rauschmayer |
| 2003/0091053 A1 | 5/2003 | Tzannes et al. |
| 2003/0091133 A1 | 5/2003 | Redfern et al. |
| 2004/0087282 A1 | 5/2004 | Ishikawa |

FOREIGN PATENT DOCUMENTS

| | | |
|---|---|---|
| EP | 1363410 A1 * | 11/2003 |
| WO | WO 03039031 A1 * | 5/2003 |

OTHER PUBLICATIONS

Ginis, G.; Cioffi, J.M.;"Vectored transmission for digital subscriber line systems," IEEE Journal on Selected Areas in Communications, ,vol. 20 , Issue: 5 , Jun. 2002, pp. 1085-1104.

* cited by examiner

TECHNIQUE FOR IMPROVING MULTIPLE-CHANNEL MULTI-TONE TRANSMISSIONS

CROSS-REFERENCE TO RELATED PATENT APPLICATIONS

This patent application claims priority to U.S. Provisional Patent Application No. 60/480,769, filed Jun. 24, 2003, entitled "Multiple Channel Multitone Transmission Using Both Multiplexing And Diversity On A Paired-Tone Basis," which is hereby incorporated by reference herein in its entirety.

FIELD OF THE INVENTION

The present invention relates generally to telecommunications and more particularly to a technique for improving multiple-channel multi-tone transmissions.

BACKGROUND OF THE INVENTION

Digital subscriber line (DSL) and wireless systems often are susceptible to any of a variety of signal impairments, including, for example, near end cross talk (NEXT), far end cross talk (FEXT), radio frequency interference (RFI), attenuation due to long distances, and noise introduced by bridge taps. A number of techniques have been developed in an attempt to limit or eliminate some or all of these impairments. For various reasons, however, these techniques are limited in that they typically either fail to satisfactorily reduce all of the various forms of impairment or they are expensive and unwieldy to implement, or both.

One such technique developed to reduce signal impairments in asynchronous DSL (ADSL) includes the implementation of a vector or multi-input, multi-output (MIMO)-based broadband access architecture. Vector-based techniques provide for dynamic spectrum allocation among connected units and supervised matrix cancellation of central office (CO) NEXT and FEXT. Vector-based techniques, however, are expensive to implement and rely on a number of often unreasonable assumptions, such as the assumption that all customer premise equipments (CPEs) are connected to at least one other CPE, the assumption that the allocated spectrums may be quickly verified against spectral compatibility rules, and the assumption that the allocated mask may become standardized even though it often takes considerable time just to standardize a slight modification to an edge of a mask. Moreover, vector-based techniques typically do not address the reduction of impairments caused by CPE cross talk when CPEs are not interconnected, RFI, and bridge taps.

Bonding is another technique commonly used in single carrier systems, such as, for example, G.SHDL (also known as ITU G.991.2). Bonding typically comprises transmitting the symbol payload in parallel over two or more channels (e.g., two or more twisted pair lines). Diversity techniques then may be used with the bonded physical channels to improve the reach of the transmitted symbol stream or multiplexing techniques may be used to improve the rate of the symbol stream. Diversity commonly refers to the use of some form of spatial redundancy shared by multiple channels to improve the robustness of the transmitted signal whereby the same symbol is transmitted over the bonded channels and the received symbols are compared at the destination to arrive at an estimate of the actual symbol transmitted. Various techniques may be used to implement diversity, such as, for example, space-time encoding or joint detection algorithms. On the contrary, multiplexing (also commonly referred to BLAST in the wireless context) provides for the parallel transmission of a separate symbol stream over each bonded channel. The individual streams then are demultiplexed at the destination to form a single symbol stream. It will be recognized that the use of diversity techniques provides for robustness in the presence of significant signal impairments at the cost of rate while multiplexing provides for increased rate while being more susceptible to signal impairments. Conventional data transmission systems typically fail to benefit from both multiplexing and diversity because the goals and implementation of multiplexing often differ from those of diversity.

SUMMARY OF THE INVENTION

The present invention mitigates or solves the above-identified limitations in known solutions, as well as other unspecified deficiencies in known solutions. A number of advantages associated with the present invention are readily evident to those skilled in the art, including economy of design and resources, transparent operation, cost savings, etc.

Disclosed herein are various exemplary mechanisms for data transmission in multiple channel, multiple carrier transmission systems. A transmitter may be connected to a receiver by two or more bonded channels, the frequency transmission bandwidths of each of the bonded channels being segmented into frequency sub-bands or "tones." Each tone may be used to transmit a symbol stream in parallel with symbol streams on the other tones using DMT, OFDM or similar multiple carrier transmission techniques. If the signal impairments for a given tone are not significant, a multiplexing technique may be implemented for the given tone whereby a different symbol stream is transmitted over the given tone for each bonded channel. If substantial signal impairment exists for a given tone, a diversity technique may be implemented for the given tone whereby the same symbol stream is transmitted over the given tone for each bonded channel. This redundancy allows the receiver to accurately reconstruct the transmitted symbol stream even in the presence of significant interference.

In accordance with one embodiment of the present invention, a method for transmitting data over at least two bonded channels is provided, wherein each of the at least two bonded channels comprises a plurality of tones. The method may comprise: transmitting a first symbol stream over a first tone in a first bonded channel and over a second tone in a second bonded channel, wherein the first tone is bonded to the second tone, and the transmissions over the first tone and the second tone are substantially in parallel; transmitting a second symbol stream over a third tone in the first bonded channel; and transmitting a third symbol stream over a fourth tone in the second bonded channel, wherein the third tone is bonded to the fourth tone, and the transmissions of the second symbol stream and the third symbol stream are substantially in parallel.

In accordance with another embodiment of the present invention, a method for receiving data over at least two bonded channels is provided, wherein each of the at least two bonded channels comprises a plurality of tones. The method may comprise: converting a first symbol stream to a first data stream, the first symbol stream being received in parallel over a first tone in a first bonded channel and over a second tone in a second bonded channel, wherein the first tone is bonded to the second tone; converting a second symbol stream to a second data stream, the second symbol stream being received over a third tone in the first bonded channel; and converting a third symbol stream to a third data stream, the third symbol stream being received over a fourth tone in the second bonded channel, wherein the third tone is bonded to the fourth tone, and the receptions of the second symbol stream and the third symbol stream are substantially in parallel.

In accordance with yet another embodiment of the present invention, a transmitter for transmitting data over at least two bonded channels is provided, wherein each of the at least two bonded channels comprises a plurality of tones. The transmitter may comprise: means for converting the data into a plurality of symbol streams for transmission; means for transmitting a first symbol stream over a first tone in a first bonded channel and over a second tone in a second bonded channel, wherein the first tone is bonded to the second tone, and the transmissions over the first tone and the second tone are substantially in parallel; means for transmitting a second symbol stream over a third tone in the first bonded channel; and means for transmitting a third symbol stream over a fourth tone in the second bonded channel, wherein the third tone is bonded to the fourth tone, and the transmissions of the second symbol stream and the third symbol stream are substantially in parallel.

In accordance with an additional embodiment of the present invention, a receiver for receiving data over at least two bonded channels is provided, wherein each of the at least two bonded channels comprises a plurality of tones. The receiver may comprise: means for converting a first symbol stream to a first data stream, the first symbol stream being received in parallel over a first tone in a first bonded channel and over a second tone in a second bonded channel, wherein the first tone is bonded to the second tone; means for converting a second symbol stream to a second data stream, the second symbol stream being received over a third tone in the first bonded channel; and means for converting a third symbol stream to a third data stream, the third symbol stream being received over a fourth tone in the second bonded channel, wherein the third tone is bonded to the fourth tone, and the receptions of the second symbol stream and the third symbol stream are substantially in parallel.

In accordance with yet another embodiment of the present invention, a computer readable medium having code for causing a processor to transmit data over at least two bonded channels is provided, wherein each of the at least two bonded channels comprises a plurality of tones. The computer readable medium may comprise: code adapted to transmit a first symbol stream over a first tone in a first bonded channel and over a second tone in a second bonded channel, wherein the first tone is bonded to the second tone, and the transmissions over the first tone and the second tone are substantially in parallel; code adapted to transmit a second symbol stream over a third tone in the first bonded channel; and code adapted to transmit a third symbol stream over a fourth tone in the second bonded channel, wherein the third tone is bonded to the fourth tone, and the transmissions of the second symbol stream and the third symbol stream are substantially in parallel.

In accordance with an additional embodiment of the present invention, a computer readable medium having code for causing a processor to receive data over at least two bonded channels is provided, wherein each of the at least two bonded channels comprises a plurality of tones. The computer readable medium may comprise: code adapted to convert a first symbol stream to a first data stream, the first symbol stream being received in parallel over a first tone in a first bonded channel and over a second tone in a second bonded channel, wherein the first tone is bonded to the second tone; code adapted to convert a second symbol stream to a second data stream, the second symbol stream being received over a third tone in the first bonded channel; and code adapted to convert a third symbol stream to a third data stream, the third symbol stream being received over a fourth tone in the second bonded channel, wherein the third tone is bonded to the fourth tone, and the receptions of the second symbol stream and the third symbol stream are substantially in parallel.

Still further features and advantages of the present invention are identified in the ensuing description, with reference to the drawings identified below.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements, and in which.

DETAILED DESCRIPTION OF THE INVENTION

Figure 1:
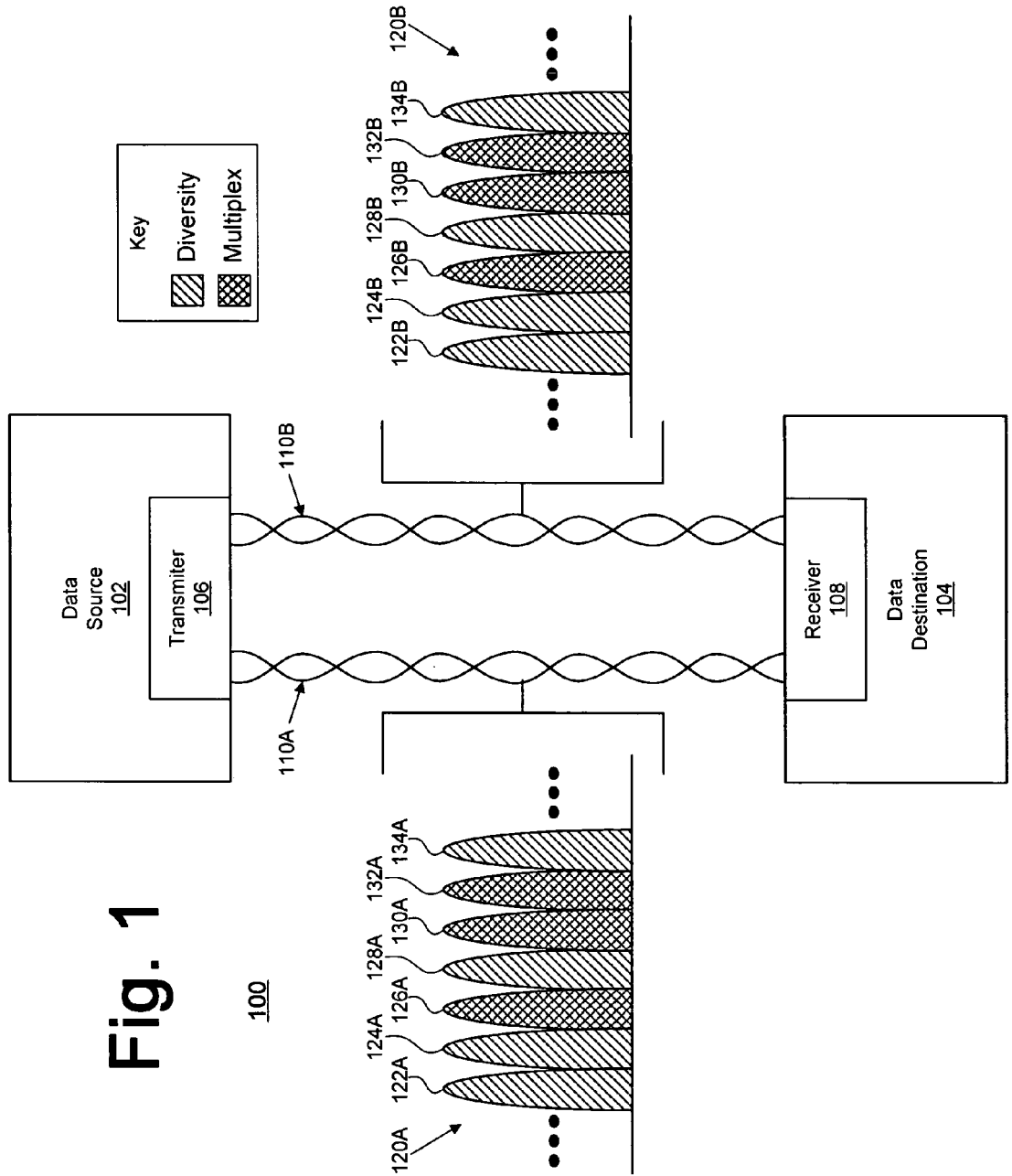
FIG. 1 is a schematic diagram illustrating an exemplary multiple channel multiple carrier-based system for transmitting data using diversity or multiplexing on a per-tone basis in accordance with at least one embodiment of the present invention.

The following description is intended to convey a thorough understanding of the present invention by providing a number of specific embodiments and details involving data transmission in multiple carrier systems using either multiplexing or diversity on a per-tone basis. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

FIGS. 1-5 illustrate various exemplary mechanisms for processing and transmitting data in multiple-channel, multiple carrier systems. In at least one embodiment, a transmitter may be connected to a receiver by two or more bonded channels, where the bonded channels may include a physically isolated medium, such as twisted pair lines or coaxial cable, or wireless "virtual" channels, or a combination thereof. The frequency transmission bandwidths of each of the bonded channels may be segmented into frequency sub-bands, or "tones," and each tone then may be used to transmit a symbol stream in parallel with symbol streams on the other tones using any of a variety of multiple carrier transmission techniques, such as DMT or OFDM.

In at least one embodiment, some or all tones may be examined for the presence of significant signal impairments. If the signal impairments for a given tone are sufficiently low under the surrounding conditions, a multiplexing technique may be implemented for the given tone whereby a different symbol stream is transmitted over the given tone for each bonded channel. This parallel transmission of different symbol streams for the given tone then may be demultiplexed at the receiver. In contrast, if the signal impairments for a given tone have a substantial potential to corrupt any symbol transmitted thereon, a diversity technique may be implemented for the given tone whereby the same symbol stream is transmitted over the given tone for each bonded channel. A spatial diversity technique preferably is used to impute redundancy to the symbol stream transmitted over diversity-mode tones, thereby allowing the receiver to accurately reconstruct the transmitted symbol stream even in the presence of significant interference.

For ease of discussion, the various exemplary systems and techniques of the present invention are described in the context of a DMT-based system having two bonded channels. Those skilled in the art, however, may adapt the exemplary systems and techniques to multiple carrier systems having more than two bonded channels (e.g., a DMT-based system having three bonded channels) or to data transmission systems utilizing techniques similar to DMT, such as wireless systems using OFDM, wavelet transform, or other unitary basis approaches, without departing from the spirit or the scope of the present invention.

Referring now to FIG. 1, an exemplary data transmission system 100 having improved data transmission characteristics achieved at least in part through the combined use of diversity and multiplexing techniques is illustrated in accordance with at least one embodiment of the present invention. In the illustrated example of FIG. 1, the system 100 includes a data source 102 having a transmitter 106 and a data destination 104 having a receiver 108. The data source 102 and the data destination 104 may be interconnected for data transmission purposes by two or more channels 110A, 110B. The data source 102 may include any of a variety of devices adapted to transmit data over two or more channels using multiple carrier data transmission techniques. Similarly, the data destination 104 may include any of a variety of devices adapted to receive data transmitted in such a manner. To illustrate, the data source 102 may include, for example, a DSL access multiplexer (DSLAM) and the data destination 104 may include, for example, a DSL customer premise equipment (CPE) (also known as a DSL modem) wherein data is communicated between the DSLAM and DSL CPE using any of a variety of multiple-channel, multiple-carrier techniques, such as, for example, DMT or OFDM. In the context of DMT-based DSL systems, the physical structure of two or more channels 110A, 110B may include, for example, twisted pair lines or coaxial cables. However, in wireless systems implementing OFDM and similar protocols, one or more of the channels 110A, 110B may include a "virtual" channel as wireless channels typically cannot be separated into physically distinct channels but instead often rely on multiple-path propagation features.

In communications systems, the transmission of data typically is bidirectional. It will be appreciated, therefore, that the data source 102 also may be a data destination for data transmitted from the data destination 104 or another device and that the data destination 104 may be a data source for the data source 102 or another device. Accordingly, the data source 102 and the data destination each may include both the transmitter 106 and the receiver 108 (commonly referred to collectively as a transceiver).

The transmitter 106, in at least one embodiment, is adapted to transmit data over the channels 110A, 110B to the receiver 108 using a DMT-based technique that incorporates both the benefits of diversity and multiplexing. This DMT-based technique is herein referred to as Twin DMT or TWDMT. As noted above, multiplex techniques for bonded channels often may improve the data transmission rate as two different symbol streams may be transmitted over two separate channels, thereby nearly doubling the overall transmission rate. Multiplexing, however, is susceptible to signal impairments that often limit the effective reach of multiplex-based transmission techniques. In contrast, diversity techniques over bonded channels increase the reach as the same symbol stream is transmitted over the bonded channels, thereby allowing the receiver to more accurately deduce the actual symbol stream. However, because the two or more bonded channels are used to transmit the same symbol stream, the data transmission rate is not as high as it would be using multiplexing techniques. Accordingly, in at least one embodiment, the transmitter 106 is adapted to implement diversity techniques for those tones of the transmission spectrum that are subject to considerable signal impairments while multiplexing techniques may be used for those tones that have relatively little signal impairment. As a result, the rate benefits of multiplexing and the reach benefits of diversity may be implemented on a per-tone basis to achieve the optimal balance between transmission rate and transmission reach.

To illustrate, FIG. 1 depicts exemplary transmission frequency spectrum portions 120A and 120B for channels 110A, 110B, respectively. The spectrum portion 120A includes tones 122A-134A and the spectrum portion 120B includes tones 122B-134B, where tone 122A is bonded to tone 122B, tone 124A is bonded to tone 124B, and so one. Bonded tones are herein referred to as "twin tones." In a preferred embodiment, a tone of channel 110A is bonded, or the "twin," of the same tone of channel 110B (i.e., twin tones have the same frequency sub-band). However, in other implementations of the invention, it may be appropriate to bond tones of different frequency sub-bands. In the illustrated example, it is assumed that tones 122A/122B, 124A/124B, 128A/128B and 134A/134B are substantially affected by signal impairments such as cross talk and RFI, whereas tones 126A/126B, 130A/130B and 132A/132B are relatively unaffected by signal impairments under the circumstances. Accordingly, the transmitter 106 may be adapted to implement one or more diversity techniques for data transmitted through the twin tones 122A-122B, 124A-124B, 128A-128B and 134A-134B and implement one or more multiplexing techniques for data transmitted through the twin tones 126A-126B, 130A-130B and 132A-132B. The receiver 108 may be adapted to receive the signals transmitted over the channels 110A, 110B and convert the signals into data for use by the data destination 104 or some other device downstream. The transmitter 106 and receiver 108 are discussed in greater detail with reference to FIGS. 3-6.

As noted above, multiplexing techniques typically are suitable when signal impairments, if any, are relatively insignificant whereas diversity techniques are intended to overcome relatively significant signal impairments. Accordingly, any of a variety of methods may be implemented to determine whether a multiplexing technique or a diversity technique is most suitable for a given twin tone. In a preferred embodiment, one or more criteria for a given tone are measured and compared, individually or in combination, with one or more identified thresholds to determine if substantial signal impairment exists for the given tone. Examples of such criteria may include indicators of signal impairments such as the signal-to-noise ratio (SNR) present for the given tone, the cross-correlation of the noise for the given tone or other quality-of-service (QoS) indicators.

In identifying the appropriate one or more thresholds with which the one or more measured criterion may be compared, various attributes of the system 100 may be considered. To illustrate, if using the SNR as a criterion for determining whether to use either diversity or multiplexing for a given tone, various parameters of the system 100 may be considered when determining the minimum threshold SNR for which multiplexing may be used, such as, for example, the distance between the transmitter 106 and the receiver 108, the symbol rate, the type of encoding used, the presence of known bridge taps, and the like. The particular threshold used may depend on the type of modulation and the QoS. For example, a minimum SNR of 14.5 dB typically is required to insure a bit error rate (BER) of $10^{-7}$ error bits/s in ADSL using 2-bit quadrature amplitude modulation (QAM). Accordingly, it may prove beneficial to employ a SNR of 14.5 dB as the threshold in such a system.

The identification of tones suitable for either multiplex mode or diversity mode may occur during the training phase of the transmitter and receiver. For example, the transmitter 106 could transmit a known sequence of symbols to the receiver 108. The receiver 108 then could compare the actual received symbol sequence with the expected symbol sequence to determine those tones that may be unsuitable for multiplex mode. This training phase may be repeated periodically during operation to identify any changes in the transmission environment. Other methods for identifying those tones suitable for multiplexing or for diversity may be implemented without departing from the spirit or the scope of the present invention.

Figure 2:
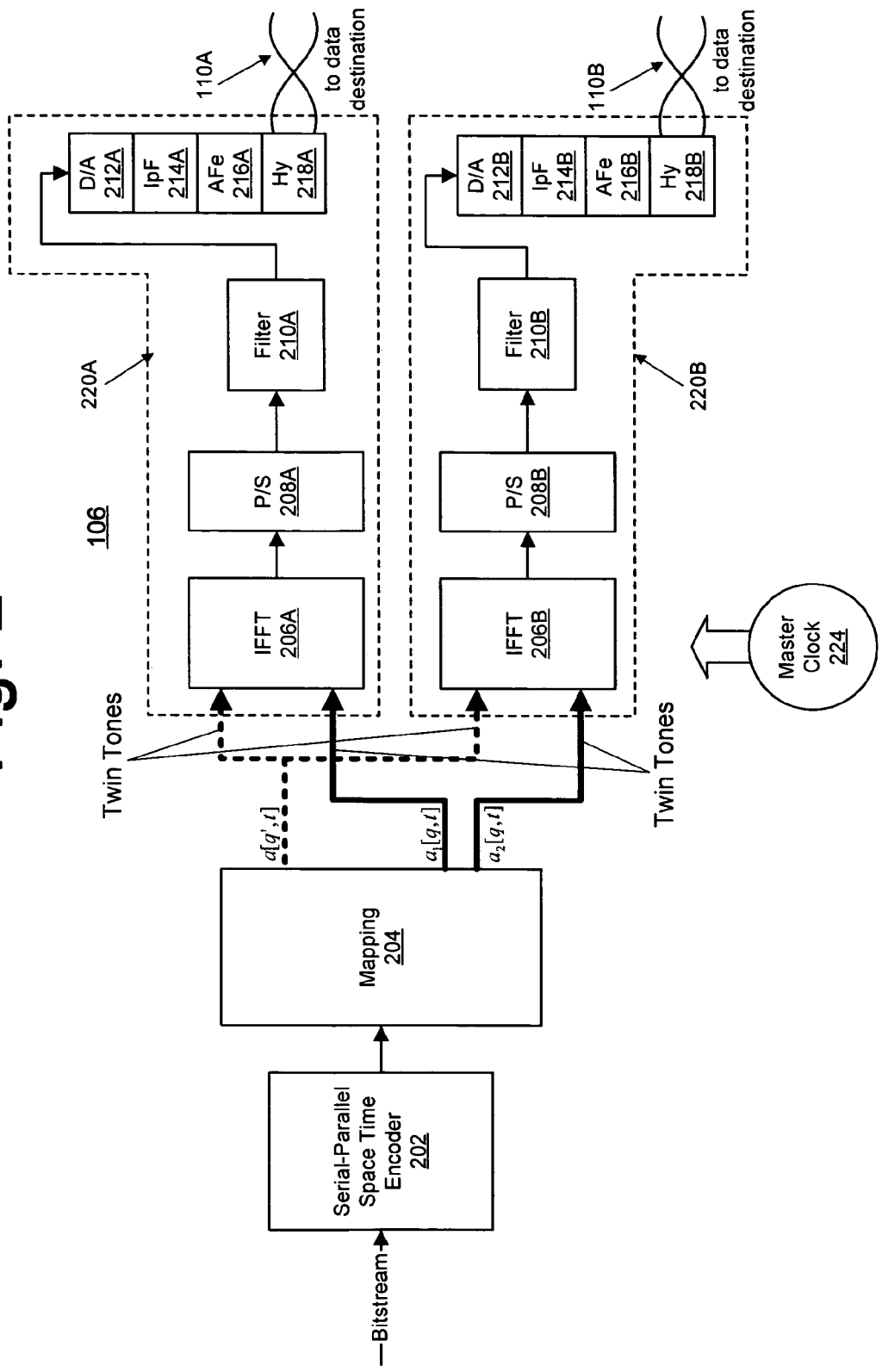
FIG. 2 is a schematic diagram illustrating an exemplary multiple channel multiple carrier-based transmitter for transmitting data using diversity or multiplexing on a per-tone basis in accordance with at least one embodiment of the present invention.
Figure 3:
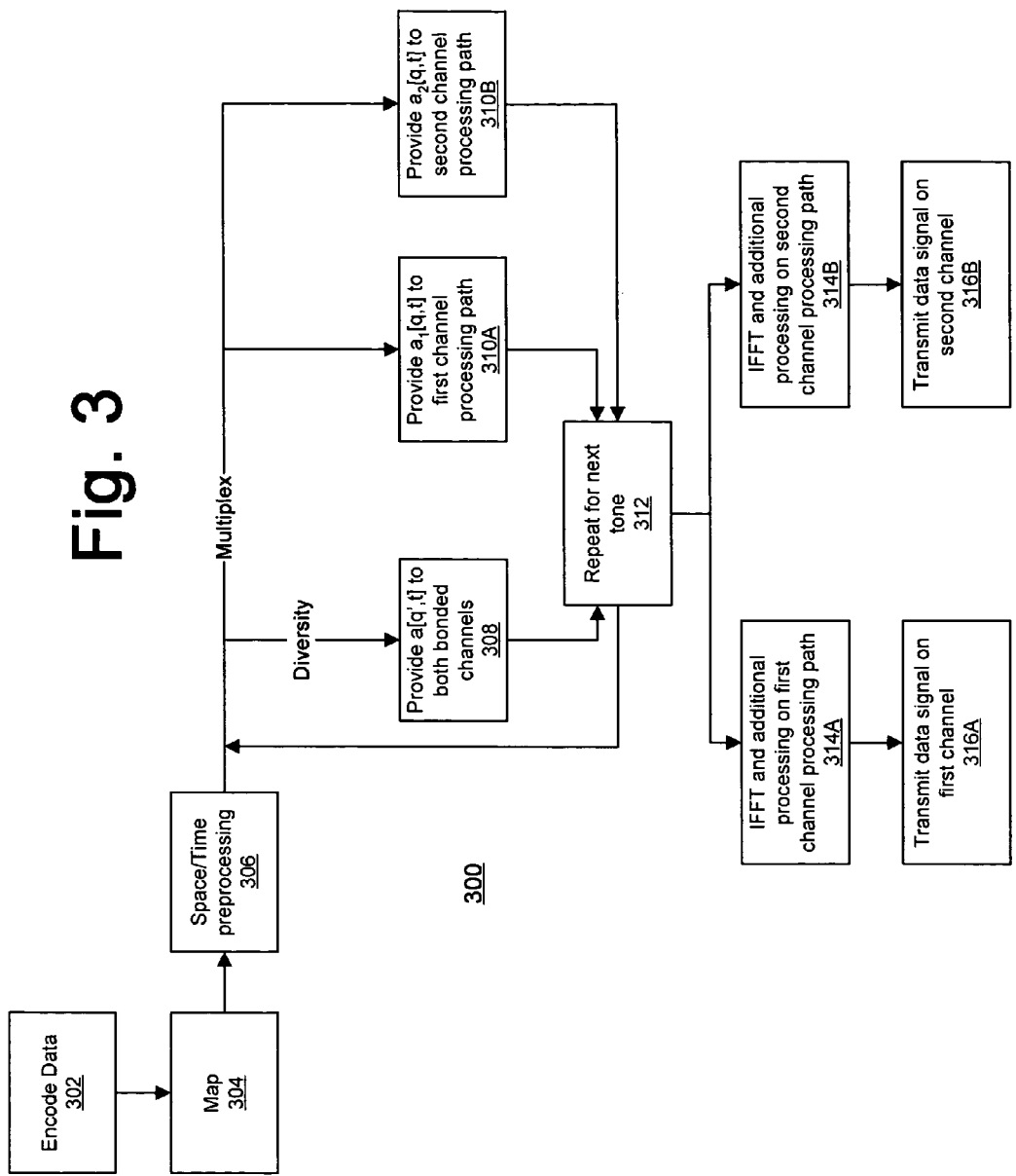
FIG. 3 is a flow diagram illustrating an exemplary operation of the transmitter of FIG. 2 in accordance with at least one embodiment of the present invention.

Referring now to FIGS. 2 and 3, an exemplary implementation of the transmitter 106 and an exemplary operation 300 of the transmitter 106 are illustrated in accordance with at least one embodiment of the present invention. In the illustrated embodiment, the transmitter 106 includes an encoder 202 and a mapping module 204. For each channel processing path 220A, 220B, the transmitter may further include an inverse fast Fourier transform (IFFT) module 206A/206B, a parallel-to-serial (P/S) converter 208A/208B, one or more filters 210A/210B, a digital-to-analog (D/A) converter 212A/212B, a low pass filter 214A/214B, an analog front end (AFe) 216A/216B, and a hybrid interface 218A/218B connected to the transmission medium of a respective channels 110A, 110B.

The components of the transmitter 106 may be implemented as software, hardware, firmware, or a combination thereof. For example, the encoder 202, mapping module 204, IFFT 206A/206B, P/S converter 208A/208B and/or filter 210A/210B may be implemented as one or more sets of executable instructions adapted to manipulate one or more processors to perform their functions described below. The one or more processors may include a microprocessor or central processing unit (CPU), an application specific integrated circuit (ASIC), a digital signal processor (DSP) and the like. The D/A converter 212A/212B, low pass filter 214A/214B, analog front end 216A/216B and hybrid 218A/218B typically are implemented as hardware components.

As noted in detail below, it may be beneficial to synchronize each processing path such that the symbol streams for each channel are synchronized for optimal performance. Accordingly, the transmitter 106 may further include a master clock 224 whose time signal may be provided to and used by one or more of the other components of the transmitter 106. Moreover, the time signal of the master clock 224 may be transmitted over one or both of channels 110A, 110B to the receiver 108 in order to synchronize the clock of the receiver 108 to the master clock 224 using any of a variety of clock-synchronization techniques (e.g., the use of a phase locked loop (PLL)).

Referring to FIG. 3, an exemplary operation of the transmitter 106 of FIG. 2 is illustrated. At step 302, data to be transmitted may be supplied as a bitstream to the encoder 202 whereupon the bitstream may be encoded to include redundant bits. This redundancy typically provides robustness to the resulting transmitted signal and allows the receiver to more accurately reconstruct the transmitted bitstream. Any of a variety of techniques may be implemented to encode the data. For example, the encoder 202 may include a multilevel encoder that employs one or a combination of the following: space-based encoding, time-based encoding, interleaving, trellis coded modulation (TCM), Reed Solomon coding, and the like. The resulting bitstream may be provided to the mapping module 204 at step 304 whereupon one or more mapping functions (also known as modulation functions) may be applied to the bitstream. Examples of mapping functions that may be beneficially used may include quadrature amplitude modulation (QAM), phase shift keying (PSK), amplitude shift keying (ASK), binary phase shift keying (BPSK), frequency shift keying (FSK), and the like.

Prior to providing the output of the mapping module 204 to the corresponding IFFT module 206A/206B, in one embodiment, space/time pre-processing may be performed on the output at step 306. This pre-processing may include introducing channel information into the symbols to be transmitted to compensate for interference between the two or more channels, thereby rendering the channels orthogonal. To illustrate, the frequency response of the channels that comprise the main path and the cross path might be identified during training on a per-bin basis. The resulting complex coefficients may be combined with the complex value that is intended to be transmitted on the channels.

The application of the mapping function(s) to the bitstream typically results in the generation of complex values, each representing a symbol to be transmitted over a respective tone of the corresponding channel. For ease of reference, those twin tones that support multiplexing are denoted herein as q and those twin tones that support diversity are denoted herein as q'. Further, the complex value representing a symbol to be transmitted over the bonded tone q' of the first channel in diversity mode is herein denoted as $a_1[q',t]$ for time symbol t. Similarly, the complex value representing a symbol to be transmitted over the twin tone q' of the second channel in diversity mode is herein denoted as $a_2[q',t]$. As noted above, the same symbol may be transmitted over the twin tones of the bonded channel when the twin tones are designated to operate in diversity mode. Therefore, the complex values $a_1$ and $a_2$ for a diversity mode twin tone q' may be denoted together as a[q',t] where:

$$a_1[q',t]=a_2[q',t]=a[q',t] \qquad \text{EQ.1}$$

The complex value representing a symbol transmitted over the bonded tone q of the first channel in multiplexing mode is denoted herein as $a_1[q,t]$ for time symbol t, the complex value representing a symbol transmitted over the second channel in multiplexing mode is denoted as $a_2[q,t]$, and so on. As noted above, different symbol streams may be transmitted over each channel for twin tones operating in multiplex mode. The relationship between complex values transmitted in multiplex mode therefore may be understood as:

$$a_1[q,t] \neq a_2[q,t] \qquad \text{EQ. 2}$$

As shown in the illustrated example, the complex value(s) generated for some or all of the tones of the frequency spectrum of the bonded channels may be distributed to one of the respective channel processing paths 220A, 220B. For a twin tone designated for diversity mode, the complex value a[q',t] may be provided at step 308 to both the first channel processing path 220A and the second channel processing path 220B for processing and transmission over both channels 110A, 110B in parallel. For a twin tone q designated for multiplex mode, the complex value $a_1[q,t]$ may be provided to the first channel processing path 220A for processing and transmission over channel 110A at step 310A and the complex value $a_2[q,t]$ may be provided to the second channel processing path 220B for processing and transmission over channel 110B at step 310B. Steps 308, 310A and 310B may be repeated at step 312 for some or all of the twin tones of the frequency spectrum of the bonded channels 110A, 110B according to the operating mode (i.e., diversity or multiplexing) of the respective twin tones.

At steps 314A and 314B, the output of the mapping module 204 is processed and prepared by the channel processing paths 220A/220B for transmittal over the physical medium of the channels 110A/110B, respectively. The channel processing paths 220A, 220B may implement techniques commonly found in DMT-based transmitters, OFDM-based transmitters and other multiple carrier-based transmission systems. Generally, this processing may include: conversion from the frequency domain to the time domain by the IFFT modules 206A/206B using, for example, an IFFT or similar process. The output of the IFFT modules 206A/206B then may undergo a parallel-to-serial conversion by the P/S modules 208A/208B, shape filtering or other types of filtering by the filters 210A/210B. The resulting data then may be converted from the digital domain to the analog domain for transmission by the D/A converters 212A/212B and then filtered by the low pass filters 214A/214B. The resulting analog signals then may be provided to the analog front ends 216A/216B at steps 316A, 316B for transmission via hybrid interface 218A/218B to the receiver 108 over the channel 110A, 110B, respectively.

Figure 4:
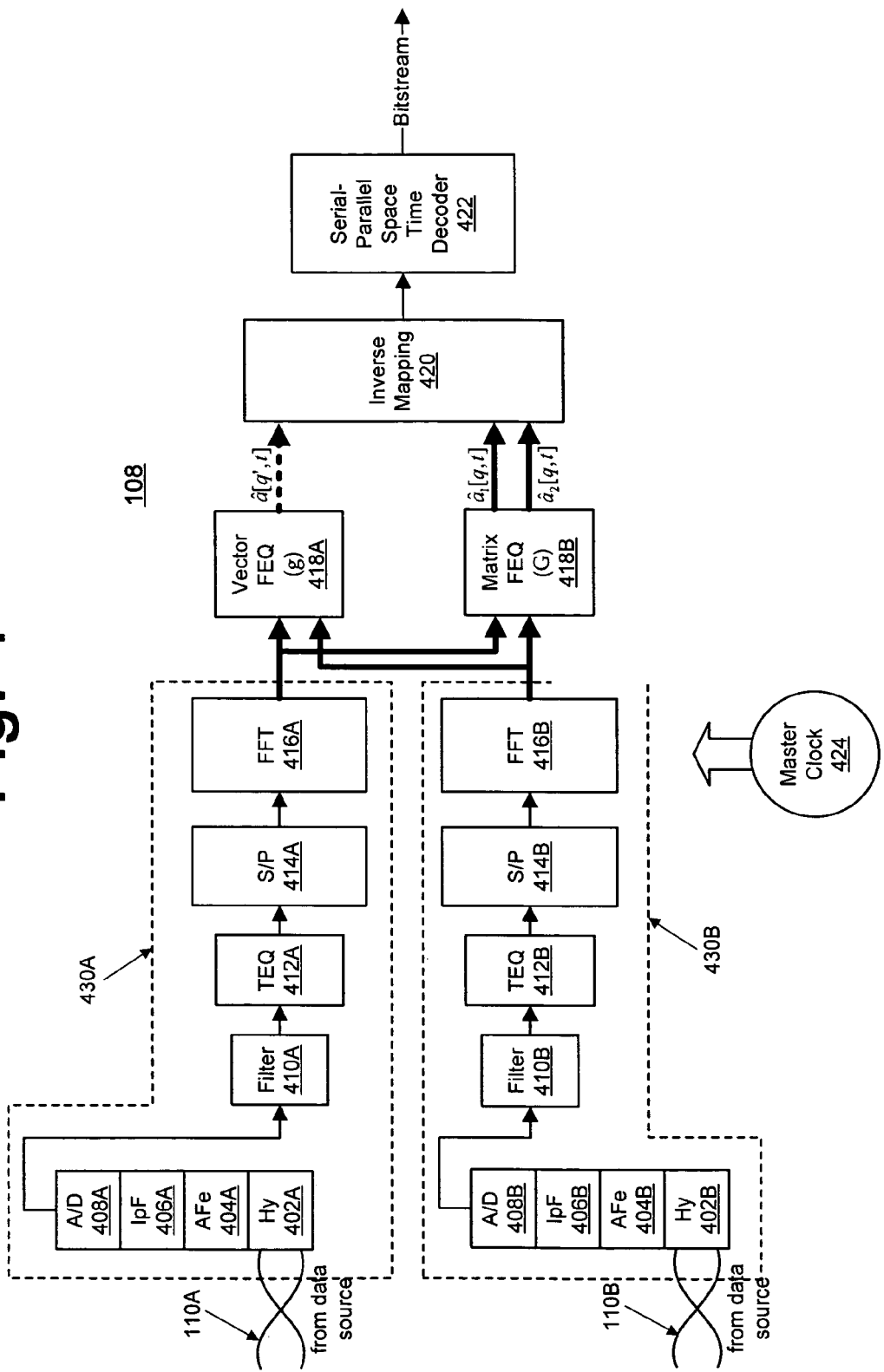
FIG. 4 is a schematic diagram illustrating an exemplary multiple channel multiple carrier-based receiver for receiving data using either diversity or multiplexing on a per-tone basis in accordance with at least one embodiment of the present invention.
Figure 5:
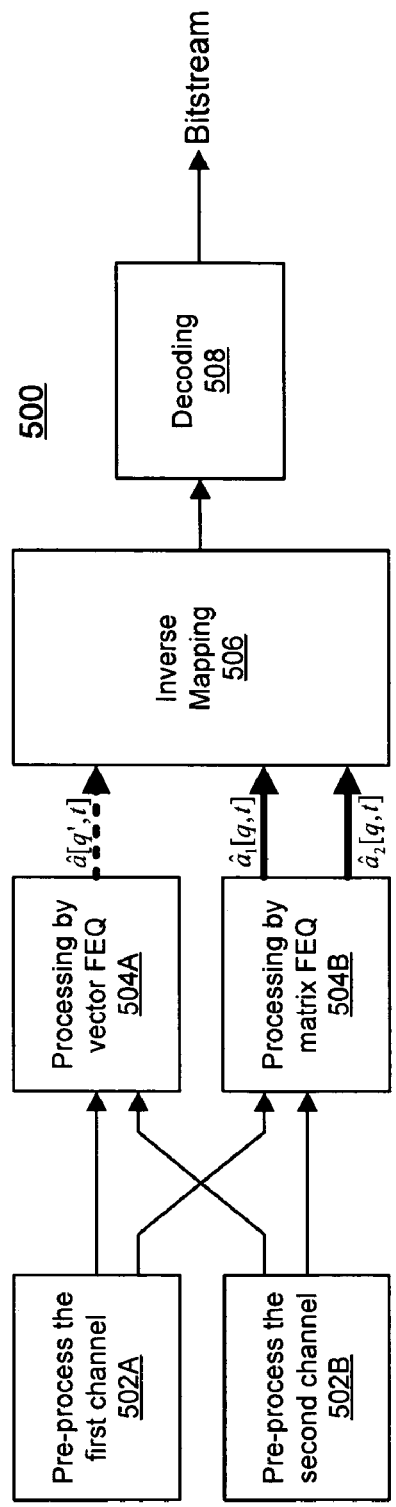
FIG. 5 is a flow diagram illustrating an exemplary operation of the receiver of FIG. 4 in accordance with at least one embodiment of the present invention.

Referring now to FIGS. 4 and 5, an exemplary implementation of the receiver 108 of FIG. 1 and an exemplary operation 500 of the receiver 108 are illustrated in accordance with at least one embodiment of the present invention. In the illustrated embodiment, the receiver 108 includes channel processing paths 430A, 430B for channels 110A, 110B, respectively. The channel processing path 430A may include a hybrid interface 402A, an analog front end 404A, a low pass filter 406A, an analog-to-digital (A/D) converter 408A, a shaping filter 410A, a time-domain equalizer 412A, a serial-to-parallel (S/P) converter 414A, and a fast Fourier transform (FFT) module 416A. Likewise, the channel processing path 430B may include a hybrid interface 402B, an analog front end 404B, a low pass filter 406B, an analog-to-digital (A/D) converter 408B, a shaping filter 4101B, a time-domain equalizer 412B, S/P converter 414B, and a FFT module 416B.

The receiver 108 further may include a vector frequency equalizer (FEQ) 418A for processing diversity-mode tones and a matrix FEQ 418B for processing multiplex-mode based tones. The receiver 108 also may include an inverse mapping module 420 and decoder 422 to inverse map and decode the output of the FEQs 418A, 418B to generate a bitstream that represents the bitstream provided to the encoder 202 of the transmitter 106 (FIG. 2). The components of the receiver 108 may be implemented as software, hardware, firmware, or a combination thereof. As with the transmitter 106, the hybrid interface 402A/402B, the analog front end 404A/404B, low pass filter 406A/406B and A/D converter 408A/408B typically are implemented as hardware components whereas the filter 410A/410B, TEQ 412A/412B, S/P converter 414A/414B, FFT 416A/416B, vector FEQ 418A, matrix FEQ 418B, inverse mapping module 420 and decoder 422 typically are implemented as one or more sets of executable instructions adapted to manipulate one or more processors to perform the functions described below. It should be understood that alternative configurations of hardware and software may be implemented as contemplated by the present invention.

It will be appreciated that the twin receiver's time domain symbols generally need to be aligned because they may be demodulated jointly. Accordingly, the receiver 108 additionally may include a master clock 424 to synchronize some or all of the receiver components so that the incoming symbol stream of each channel may be processed in parallel with the symbol stream of the other channel. Further, the master clock 424 may be synchronized with the master clock 224 of the transmitter 106 (FIG. 2) using a PLL or other suitable technique.

Referring to FIG. 5, an exemplary operation 500 of the receiver 108 of FIG. 1 is illustrated. At step 502A, the signal received over the first channel (channel 110A) may be preprocessed by the channel processing path 430A to convert the transmitted signal from the time-domain to the frequency domain, to improve the signal characteristics, and the like. The signal received over the second channel (channel 110B) may be similarly preprocessed by the channel processing path 430B.

The channel processing paths 430A, 430B may implement techniques commonly found in DMT-based receivers, OFDM-based receivers and other multiple carrier-based reception systems. This preprocessing may be viewed as the inverse or complement of the processing provided by the channel processing paths 220A, 220B (FIG. 2) and typically may include: processing by hybrid module 402A/402B to reduce or remove undesirable effects of the simultaneous transmission and reception of signals over the same channel; processing by the analog front end 404A/404B (analogous to the analog front end 216A/216B of FIG. 2); low pass filtering by low pass filter 406A/406B; analog-to-digital conversion by A/D converter 408A/408B; and shape filtering by filter 410A/410B.

The output of the filters 410A/410B then may be processed by a time-domain equalizer (TEQ) 412A/412B. While FIG. 4 illustrates the processing of each channel by a separate TEQ, it will be appreciated that the channels 110A, 110B may be cross-coupled and it therefore may be advantageous to process both channels by the same TEQ to use the information in one channel to reduce the interference it caused the other channel. The output of the TEQs 412A/412B then may undergo a serial-to-parallel conversion by the S/P module 414A/414B. The serialized output then may be converted from the time domain to the frequency domain by the FFT module 416A/416B using an FFT process or similar process. The resulting processed signal for each channel then may be supplied to both the vector FEQ 418A and the matrix FEQ 418B.

A symbol transmitted in parallel over bonded channels operating in diversity mode typically experiences a complex gain $h_i[q']$ and complex disturbances $w_i[q',t]$ for channel i of the two or more bonded channels, where the complex disturbances may be correlated as a result of cross talk between the channels, as illustrated by EQs. 3 and 4:

$$x[q', t] \equiv \begin{bmatrix} x_1[q', t] \\ x_2[q', t] \end{bmatrix} \qquad \text{EQ. 3}$$

$$x[q', t] = h[q']a[q, t] + w[q' t] \qquad \text{EQ. 4}$$

Accordingly, at step 504A, the received signals, denoted herein as $x_1[q',t]$ and $x_2[q',t]$ for channels 110A, 110B, respectively, may be processed by the vector FEQ 418A using a vector FEQ function g[q',t] to derive an estimate, denoted â[q',t], of the complex value a[q',t] originally transmitted. The process performed by the vector FEQ 418A may be represented mathematically as:

$$\hat{a}[q',t] = x^T[q',t]g[q',t] \qquad \text{EQ. 5}$$

where $x^T$ represents the column-to-row transform of x. An appropriate vector FEQ function g[q',t] may be determined using any of a variety of techniques, such as, for example, a least-mean-squared approach or a maximum-likelihood approach. The vector FEQ function g[q',t] preferably is derived during training and/or periodically during operation and is selected so that the difference between the estimate â[q',t] and the transmitted complex value a[q',t] is minimized.

It will also be appreciated that a symbol transmitted over a channel operating in multiplex mode typically experiences a direct path complex gain $h_{ii}[q]$ and complex disturbances $w_i[q',t]$ for channel i. The symbol also typically experiences a "twin FEXT" path complex gain $h_{ij}[q]$ for j=1 ... n, where n represents the number of bonded channels. The resulting received signal $x_i[q,t]$ may be represented as:

$$x_i[q,t] = h_{ii}[q]a_i[q,t] + h_{ij}[q]a_j[q,t] + q_i[q,t] \qquad \text{EQ. 6}$$

or $$x[q,t] = H[q]a[q,t] + w[q,t] \qquad \text{EQ. 7}$$

where $$x[q, t] \equiv \begin{bmatrix} x_1[q, t] \\ x_2[q, t] \\ \ldots \\ x_n[q, t] \end{bmatrix} \qquad \text{EQ. 8}$$

$$H[q] \equiv \begin{bmatrix} h_{11}[q] + h_{12}[q] \\ h_{22}[q] + h_{21}[q] \\ \ldots \\ h_{nn}[q] + h_{n,n-1}[q] \end{bmatrix} \qquad \text{EQ. 9}$$

$$w[q] \equiv \begin{bmatrix} w_1[q] \\ w_2[q] \\ \ldots \\ w_n[q] \end{bmatrix} \qquad \text{EQ. 10}$$

Accordingly, at step 504B, the multiplex-mode tones q of the received signals, denoted herein as $x_1[q,t]$ and $x_2[q,t]$ for channels 110A, 110B, respectively, may be processed by the matrix FEQ 418B using a matrix FEQ function G[q,t] to derive an estimate, denoted $\hat{a}_i[q,t]$, of the complex value $a_i$ [q,t] originally transmitted over channel i. The process performed by the matrix FEQ 418B may be represented mathematically as:

$$\hat{a}[q,t] = G[q,t]x[q,t] \qquad \text{EQ. 11}$$

where G[q,t] may be determined using any of a variety of techniques, such as, for example, a least-mean-squared approach or a maximum-likelihood approach. As with the vector FEQ function g[q',t], an appropriate matrix FEQ function G[q,t] may be determined using any of a variety of techniques, such as, for example, a least-mean-squared approach or a maximum-likelihood approach. The matrix FEQ function G[q,t] preferably is derived during training and/or periodically during operation and is selected so that the difference between the estimate $\hat{a}_i[q,t]$ and the transmitted complex value $a_i[q,t]$ is minimized. The process represented by EQ. 11 typically reduces or eliminates FEXT resulting from the bonded channels. NEXT, however, may be mitigated through cooperation between the transmitters and receivers located on the same side.

The estimated complex values (representing the transmitted symbols) then may be submitted to the inverse mapping module 420 and decoder 422 for inverse mapping (step 506) and decoding (step 508) to generate a bitstream representative of the bitstream supplied to the encoder 202 of the transmitter 106 (FIG. 1). The inverse mapping process implemented by the inverse mapping module 420 preferably is compatible with the mapping process implemented by the mapping module 204 of the transmitter 106. Likewise, the decoding process implemented by the decoder 422 preferably is compatible with the encoding process implemented by the encoder 202. The resulting bitstream may be further processed as appropriate for use by the data destination 104 (FIG. 1) or other device.

At this point it should be noted that the technique for improving reach and rate of multiple-channel multi-tone transmissions in accordance with the present disclosure as described above typically involves the processing of input data and the generation of output data to some extent. This input data processing and output data generation may be implemented in hardware or software. For example, specific electronic components may be employed in a computer and/or communications network or similar or related circuitry for implementing the functions associated with multiple-channel multi-tone transmissions in accordance with the present disclosure as described above. Alternatively, one or more processors operating in accordance with stored instructions may implement the functions associated with multiple-channel multi-tone transmissions in accordance with the present disclosure as described above. If such is the case, it is within the scope of the present disclosure that such instructions may be stored on one or more processor readable carriers (e.g., a magnetic disk), or transmitted to one or more processors via one or more signals.

Other embodiments, uses, and advantages of the invention will be apparent to those skilled in the art from consideration of the specification and practice of the invention disclosed herein. The specification and drawings should be considered exemplary only, and the scope of the invention is accordingly intended to be limited only by the following claims and equivalents thereof.

What is claimed is:

1. A method for transmitting data over at least two bonded channels, wherein each of the at least two bonded channels comprises a plurality of tones, the method comprising:

transmitting, by a transmitter, a first symbol stream over a first tone in a first bonded channel and over a second tone in a second bonded channel, wherein the first tone is bonded to the second tone, and the transmissions over the first tone and the second tone are substantially in parallel;

transmitting a second symbol stream over a third tone in the first bonded channel; and transmitting a third symbol stream over a fourth tone in the second bonded channel, wherein the third tone is bonded to the fourth tone, and the transmissions of the second symbol stream and the third symbol stream are substantially in parallel, wherein in response to a determination that signal impairment for a given tone is sufficiently low, a multiplexing technique is utilized for reception and in response to a determination that signal impairment for the given tone is sufficiently high, a diversity technique is utilized for reception.

2. The method according to claim 1 further comprising identifying a first subset of the plurality of tones for transmitting a first plurality of data based on the diversity technique and identifying a second subset of the plurality of tones for transmitting a second plurality of data based on the multiplexing technique.

3. The method according to claim 1, wherein the at least two bonded channels comprise at least one of the following:
a physical medium; and
a wireless virtual channel.

4. A method for receiving data over at least two bonded channels, wherein each of the at least two bonded channels comprises a plurality of tones, the method comprising:

converting, by a converter, a first symbol stream to a first data stream, the first symbol stream being received in parallel over a first tone in a first bonded channel and over a second tone in a second bonded channel, wherein the first tone is bonded to the second tone;

converting a second symbol stream to a second data stream, the second symbol stream being received over a third tone in the first bonded channel; and converting a third symbol stream to a third data stream, the third symbol stream being received over a fourth tone in the second bonded channel, wherein the third tone is bonded to the fourth tone, and the receptions of the second symbol stream and the third symbol stream are substantially in parallel, wherein in response to a determination that signal impairment for a given tone is sufficiently low, a multiplexing technique is utilized for reception and in response to a determination that signal impairment for the given tone is sufficiently high, a diversity technique is utilized for reception.

5. The method according to claim 4 further comprising identifying a first subset of the plurality of tones for receiving a first plurality of data based on the diversity technique and identifying a second subset of the plurality of tones for receiving a second plurality of data based on the multiplexing technique.

6. The method according to claim 4, wherein the at least two bonded channels comprise at least one of the following:
a physical medium; and
a wireless virtual channel.

7. A transmitter for transmitting data over at least two bonded channels, wherein each of the at least two bonded channels comprises a plurality of tones, the transmitter comprising:

means for converting the data into a plurality of symbol streams for transmission;

means for transmitting a first symbol stream over a first tone in a first bonded channel and over a second tone in a second bonded channel, wherein the first tone is bonded to the second tone, and the transmissions over the first tone and the second tone are substantially in parallel;

means for transmitting a second symbol stream over a third tone in the first bonded channel; and means for transmitting a third symbol stream over a fourth tone in the second bonded channel, wherein the third tone is bonded to the fourth tone, and the transmissions of the second symbol stream and the third symbol stream are substantially in parallel, wherein in response to a determination that signal impairment for a given tone is sufficiently low, a multiplexing technique is utilized for reception and in response to a determination that signal impairment for the given tone is sufficiently high, a diversity technique is utilized for reception.

8. The transmitter according to claim 7 being configured to utilize a first subset of the plurality of tones for transmitting a first plurality of data based on the diversity technique and to utilize a second subset of the plurality of tones for transmitting a second plurality of data based on the multiplexing technique.

9. The transmitter according to claim 7, wherein the at least two bonded channels comprise at least one of the following:
a physical medium; and
a wireless virtual channel.

10. A receiver for receiving data over at least two bonded channels, wherein each of the at least two bonded channels comprises a plurality of tones, the receiver comprising:

means for converting a first symbol stream to a first data stream, the first symbol stream being received in parallel over a first tone in a first bonded channel and over a second tone in a second bonded channel, wherein the first tone is bonded to the second tone;

means for converting a second symbol stream to a second data stream, the second symbol stream being received over a third tone in the first bonded channel; and means for converting a third symbol stream to a third data stream, the third symbol stream being received over a fourth tone in the second bonded channel, wherein the third tone is bonded to the fourth tone, and the receptions of the second symbol stream and the third symbol stream are substantially in parallel, wherein in response to a determination that signal impairment for a given tone is sufficiently low, a multiplexing technique is utilized for reception and in response to a determination that signal impairment for the given tone is sufficiently high, a diversity technique is utilized for reception.

11. The receiver according to claim 10 being configured to utilize a first subset of the plurality of tones for receiving a first plurality of data based on the diversity technique and to utilize a second subset of the plurality of tones for receiving a second plurality of data based on the multiplexing technique.

12. The receiver according to claim 10, wherein the at least two bonded channels comprise at least one of the following:
a physical medium; and
a wireless virtual channel.

13. The receiver according to claim 10 further comprising means for demultiplexing the first, second and third data streams.

14. A computer readable medium having code for causing a processor to transmit data over at least two bonded channels, wherein each of the at least two bonded channels comprises a plurality of tones, the computer readable medium comprising:

code adapted to transmit a first symbol stream over a first tone in a first bonded channel and over a second tone in a second bonded channel, wherein the first tone is bonded to the second tone, and the transmissions over the first tone and the second tone are substantially in parallel;

code adapted to transmit a second symbol stream over a third tone in the first bonded channel; and code adapted to transmit a third symbol stream over a fourth tone in the second bonded channel, wherein the third tone is bonded to the fourth tone, and the transmissions of the second symbol stream and the third symbol stream are substantially in parallel, wherein in response to a determination that signal impairment for a given tone is sufficiently low, a multiplexing technique is utilized for reception and in response to a determination that signal impairment for the given tone is sufficiently high, a diversity technique is utilized for reception.

15. The computer readable medium according to claim 14 further comprising code adapted to identify a first subset of the plurality of tones for transmitting a first plurality of data based on the diversity technique and code adapted to identify a second subset of the plurality of tones for transmitting a second plurality of data based on the multiplexing technique.

16. The computer readable medium according to claim 14, wherein the at least two bonded channels comprise at least one of the following:
  a physical medium; and
  a wireless virtual channel.

17. A computer readable medium having code for causing a processor to receive data over at least two bonded channels, wherein each of the at least two bonded channels comprises a plurality of tones, the computer readable medium comprising:

code adapted to convert a first symbol stream to a first data stream, the first symbol stream being received in parallel over a first tone in a first bonded channel and over a second tone in a second bonded channel, wherein the first tone is bonded to the second tone;

code adapted to convert a second symbol stream to a second data stream, the second symbol stream being received over a third tone in the first bonded channel; and code adapted to convert a third symbol stream to a third data stream, the third symbol stream being received over a fourth tone in the second bonded channel, wherein the third tone is bonded to the fourth tone, and the receptions of the second symbol stream and the third symbol stream are substantially in parallel, wherein in response to a determination that signal impairment for a given tone is sufficiently low, a multiplexing technique is utilized for reception and in response to a determination that signal impairment for the given tone is sufficiently high, a diversity technique is utilized for reception.

18. The computer readable medium according to claim 17 further comprising code adapted to identify a first subset of the plurality of tones for receiving a first plurality of data based on the diversity technique and code adapted to identify a second subset of the plurality of tones for receiving a second plurality of data based on the multiplexing technique.

19. The computer readable medium according to claim 17, wherein the at least two bonded channels comprise at least one of the following:
  a physical medium; and
  a wireless virtual channel.

* * * * *

UNITED STATES PATENT AND TRADEMARK OFFICE
CERTIFICATE OF CORRECTION

PATENT NO.       : 7,653,138 B2
APPLICATION NO.  : 10/874329
DATED            : January 26, 2010
INVENTOR(S)      : Duvaut et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1605 days.

Signed and Sealed this

Twenty-third Day of November, 2010

David J. Kappos
*Director of the United States Patent and Trademark Office*